United States Patent [19]

Beach

[11] Patent Number: 5,213,091
[45] Date of Patent: May 25, 1993

[54] DOWNDRAFT GAS RANGE WITH SEALED BURNER SYSTEM

[75] Inventor: Stanley H. Beach, Indianapolis, Ind.

[73] Assignee: Maytag Corporation, Newton, Iowa

[21] Appl. No.: 919,710

[22] Filed: Jul. 24, 1992

[51] Int. Cl.$^5$ ............................................. F24C 15/20
[52] U.S. Cl. .................................. 126/299 D; 431/354; 126/39 H
[58] Field of Search ............ 126/299 R, 299 D, 39 H, 126/39 N, 39 R; 431/354

[56] References Cited

U.S. PATENT DOCUMENTS 4,413,610 11/1983 Berlik .................................. 126/39 R
4,750,470 6/1988 Beach et al. ...................... 126/299 D
5,119,802 6/1992 Cherry et al. .................... 126/299 D Primary Examiner—Carroll B. Dority
Attorney, Agent, or Firm—Willian Brinks Olds Hofer Gilson & Lione

[57] ABSTRACT

A thermally efficient gas range includes a top surface adapted to be sealed to a gas burner assembly, and a downdraft plenum adjacent the gas burner assembly adapted to draw cooking vapors, heat and the products of combustion and cooking from adjacent the surface of the range and the gas burner assembly, and a sealed, powered gas burner assembly comprising an open flame surface burner and a combined air and gas supply means adapted for connection with an air flow source and a gas flow source to provide a combustible gas/air mixture to a sealed conduit connected between the gas burner and the combined air and gas flow supply means. The combined air and gas flow supply means combines flows of primary combustion air and gas from their respective sources and controls the air flow and gas flow to provide a burning gas/air jet at each burner outlet with rapid, substantially complete combustion in a short, stable flame which is substantially immune to such outside influences as the downdraft exhaust and limits generation of CO and $NO_x$.

18 Claims, 3 Drawing Sheets

DOWNDRAFT GAS RANGE WITH SEALED BURNER SYSTEM

FIELD OF THE INVENTION

This invention relates to gas ranges including a downdraft exhaust for the cooking surface and, more particularly, relates to a sealed gas burner system for downdraft ranges to provide a variable, forced air-gas mixture for cooking.

BACKGROUND OF THE INVENTION

Gas ranges typically use atmospheric burners. Such atmospheric burners perform well when a plentiful supply of secondary air surrounds the burner. Typically, secondary air is supplied in such ranges through one or more aeration openings in the burner pan surrounding the burner body. In addition, secondary air is often supplied through a central opening in the burner. Such openings, however, create problems in the use of gas ranges because they permit spills, boilovers and the like to run from the top of the gas range into its interior, creating an undesirable cleaning problem.

Furthermore, combustion of any fuel, including natural gas and the other gas fuels that are used in household gas ranges, generally results in undesirable byproducts such as carbon monoxide (CO) and oxides of nitrogen ($NO_x$). These pollutants are not direct products of perfect combustion but generally result from incomplete combustion and the presence of secondary air. Efforts to protect the environment have resulted in legislation and standards to limit permissible levels of such pollutants in both the United States and Europe, and it is expected that such legislation will become more widespread and that the resulting standards will become more stringent. It is clearly desirable to avoid the generation and distribution of such pollutants during the operation of gas ranges in the household of a user, and various apparatus have been proposed to reduce the generation and distribution of pollutants in the operation of gas burners.

As indicated above, it is desirable that the range top be sealed to preclude liquids and materials from entering the interior of the range. Some sealed, smooth-top gas ranges have included blowers or fans to produce both a flow of combustion air to, and an exhaust of combustion products from, burners that are located under a sealed glass or ceramic top of the range. See U.S. Pat. Nos. 2,870,829; 3,404,350; 3,870,457; 3,968,785; and 4,020,821. For example, U.S. Pat. No. 4,020,821 to Reid, Jr. et al, discloses a gas burning range with a sealed, smooth, glass or ceramic top lying over a plurality of infrared burners. In the gas range of Reid, Jr. et al., a primary gas/air mixture is provided for each burner from a combined gas and air shutter valve to a burner tip for combustion. A blower creates a negative pressure in each burner and throughout the flow path for the fuel gas, draws a flow of additional air for combustion into the gas flow path, and creates an exhaust for the combustion products leaving the burners. Such sealed top ranges generally rely on infrared heating of cooking utensils through the sealed top and are thus not as thermally efficient or as fast as open flame ranges.

Sealed top gas ranges with open flame burners have been obtained by, for example, sealing the burner head to the top range surface or burner pan. The use of such "sealed burners" in gas range construction eliminates the openings through which secondary air reaches the burners, and the air needed for combustion must enter the combustion zone in a path which is below the existing products of combustion, and the performance of the range burners is vulnerable to a number of adverse effects. Among the problems presented by such open flame, sealed burner constructions are the recirculation of products of combustion, the tendency of the gas flames to "reach" for combustion air which distorts the flame pattern and detracts from even heat distribution, the destruction of flame patterns as a result of adjacent walls that interfere or divert the secondary air supply, and flame distortion created by the simultaneous operation of adjacent burners that compete for secondary air as their flames tend to be drawn toward the natural thermal updraft of the adjacent burners. Attempts to solve such problems have included high grate tops and other barriers seeking to prevent such burner interaction.

Gas ranges with downdraft exhaust systems are known, as shown, for example, by U.S. Pat. Nos. 4,413,610; 4,413,611; 4,409,954; 4,457,293; and 4,750,450.

The problems attendant sealed burners are compounded in gas ranges with downdraft exhausts. The purpose of the downdraft exhaust is, of course, to remove products of combustion and cooking vapors from the gas range during its operation by creating a flow of exhaust air across the top of the range adjacent the burners. The air flow from such a forced exhaust pulls the flames in the direction of the exhaust, interfering with proper combustion and heat distribution at the burners. The air flow created by the downdraft exhaust means also pulls the secondary air away from the burner flames, and the disturbed flame cones impinge on relatively cold grate fingers to cause incomplete combustion. In some designs, heat from the burners of a downdraft gas range has been so unevenly distributed that it is not possible to evenly cook such foodstuffs as pancakes, eggs and sausages in a large skillet. In addition, a low simmer flame cannot be satisfactorily stabilized and ignition of the flame becomes unreliable.

Prior efforts to combine open flame sealed burners with a downdraft exhaust have also used shields extending several inches above the burner to help protect the burner flame from the exhaust flow. Other attempts have elevated the entrance to the downdraft exhaust plenum several inches above the cooktop in an effort to minimize the adverse effect of the exhaust at the cooktop surface. In still further efforts, the downdraft exhaust has been reduced in power, or the entrance to the downdraft plenum has been remotely located from the burners, or has been reduced in intake area, in attempts to minimize the adverse effect of the exhaust. Each of these methods, however, detracts from the effectiveness of the downdraft exhaust and reduces its ability to capture and remove cooking vapors, odors, heat and other products of combustion and cooking.

The use of powered gas burners in gas cooking ranges has been disclosed in the art. For example, U.S. Pat. Nos. 3,468,298 to Teague, Jr. et al. discloses a sealed, smooth-top gas range with a plurality of powered infrared burners. In the gas range of Teague, Jr. et al, a blower supplies air to and pressurizes a manifold extending along the front of the range. The manifold has openings formed in its bottom, one for each of the plurality of burners. A slide valve for each burner includes air control orifices cooperating with a manifold opening for each burner to permit a variable and controllable flow of combustion air from the manifold into a separate valve manifold, and from the separate valve manifold through a venturi mixer to its associated burner. Gas flow to the venturi mixer and burner is controlled by a diaphragm-operated gas flow regulator, which is operated by the air pressure in the valve manifold to control the gas/air mixture to each burner.

U.S. Pat. No. 4,569,328 to Shukla et al. seeks to avoid emission of air pollutants, such as carbon monoxide and oxides of nitrogen, into the kitchen. The Shukla et al. patent discloses a gas range with a ceramic tile forming a plurality of openings provided, preferably, with a forced air-gas mixture and adapted to provide an open standing flame close to its upper surface so that the ceramic tile burner will provide high radiant heat as a result of the gas flame. In Shukla et al.'s invention, a jet plate is positioned between the infrared burner and the supporting surface for the cooking utensil. The jet plate is stated to be of considerable importance in the achievement of high thermal efficiencies. Shukla et al.'s jet plate includes a plurality of perforations or jet holes to form high velocity gas jets from the combustion products of the infrared burner, and the gas jets are directed to impinge against and convectively heat the lower surface of the cooking utensil and then pass into the atmosphere of the kitchen above the cooktop.

While Shukla et al. discloses that his ceramic tile may operate as an atmospheric burner, in Shukla et al.'s preferred embodiment, a blower is positioned in the central portion of the range to pressurize an air plenum, which is linked to a plurality of mixing valve assemblies to control the flow of the forced air-gas mixture to the plurality of burners. Each mixing valve assembly provides a selected stoichiometry for its associated burner by mechanically coupling a rotatable air orifice plate to a gas valve shaft so that by rotation of the gas valve shaft to control gas flow, air flow is simultaneously controlled by the alignment of one or more of several discrete openings in the air orifice plate with a fixed opening in an air flow tube.

U.S. Pat. No. 4,960,377 to Nunes et al. discloses a gas-air mixing valve for use with residential and commercial cooking ranges. The Nunes et al. valve is designed for use preferably in a gas range having a plurality of gas burners. The Nunes et al. valve is attached to an air plenum which is pressurized by an air blower. The Nunes et al. valve is adapted to be mounted over a hole formed in the air plenum and to provide two valve openings communicating with the interior of the air plenum, one of the valve openings forming an inlet to an air-gas mixing chamber within the valve, and the other valve opening communicating with atmosphere. The two valve openings to the pressurized air plenum formed by the Nunes et al. valve are covered by a rotating orifice plate. The rotating orifice plate includes an opening cooperating with the opening between the air plenum and the air-gas mixing chamber, and an opening cooperating with the opening to atmosphere so that as the size of the entrance to the air-gas mixing chamber is increased by rotation of the orifice plate, the size of the opening between the air plenum and atmosphere is correspondingly decreased to maintain a constant air flow in the plenum for the operation of each of the gas burners. As the orifice plate is rotated, the gas valve is also operated to maintain a selected forced air-gas mixture to each cooking burner.

Other arrangements of gas ranges with power burners, and air/gas control valves for gas ranges with power burners are disclosed in U.S. Pat. Nos. 3,162,237; 3,169,871; 3,371,699; 3,592,180; 4,622,946; and 4,794,907. Notwithstanding these various developments, the use of powered surface burners is rare in household gas ranges. Variations in the characteristics and burning properties of gas from utility to utility and locale to locale have made it difficult to achieve reliable and repeatable combustion characteristics with powered surface burners in a household range.

Other patents disclosing sealed burners include British Patent Nos. 1,443,553; and 1,543,618; and U.S. Pat. Nos. 4,518,346; 4,565,523; 4,570,610; 4,690,636; 4,757,801; 4,773,383; 4,971,024; and 5,046,477.

Notwithstanding the efforts of others, no one, prior to this invention has provided a gas range with the combined advantages and abilities of a sealed top construction, downdraft exhaust and powered open flame gas burners.

SUMMARY OF THE INVENTION

The invention provides a thermally efficient sealed gas range with a downdraft exhaust combined with an open flame gas burner that limits the generation of CO and $NO_x$, is substantially immune to the adverse effects of the downdraft exhaust and of adjacent walls, and provides even heat distribution with and without the downdraft exhaust. Gas ranges of the invention feature good combustion, ignition and re-ignition with low levels of generated CO and $NO_x$, a high turndown ratio with a stable low flame setting, a high thermal efficiency at least equal to existing atmospheric gas ranges, a large entrance to the downdraft exhaust substantially flush with the cooktop and located effectively adjacent the burners, freedom from surface barriers or shields which inhibit the effectiveness of the downdraft exhaust, and immunity from adjacent walls, providing greater freedom in installation of the range.

The invention provides a gas range including a top surface adapted to be sealed to a gas burner assembly, and a downdraft plenum adjacent the gas burner assembly adapted to draw cooking vapors, heat and the products of combustion and cooking from adjacent the surface of the range and the gas burner assembly, and a sealed, powered gas burner assembly comprising a gas burner and a combined air and gas supply means adapted for connection with an air flow source and a gas flow source to provide a combustible gas-air mixture to a sealed conduit connected between the gas burner and the combined air and gas flow supply means. The combined air and gas flow supply means combines flows of primary combustion air and gas from their respective sources and controls the air flow and gas flow to provide a burning gas/air jet at each burner outlet with rapid, substantially complete combustion in a short, stable flame which is unaffected by such outside influences as the downdraft exhaust. The means for providing a combined air flow and gas flow can comprise a mixing manifold between the sealed conduit and air and gas flow sources, with control means providing a controlled flow of air and gas from the manifold to the sealed conduit. In preferred embodiments, the control means can further comprise separate air flow and gas flow control valves between the mixing manifold and the sources of air flow and gas flow respectively.

The invention provides a method of cooking with gas and a downdraft exhaust by directing a controllable flow of combustion air through a first conduit and a controllable flow of gas through a second conduit, mixing the controllable flows of combustion air and gas to provide a directed combustible flow of air and gas through a third sealed conduit to the gas burner, controlling the flows of combustion air and gas to provide a controlled variable combustion of gas at the gas burner, combusting the directed flow of combustion air and gas from the gas burner for cooking and exhausting gaseous combustion and cooking byproducts by providing a downdraft adjacent the gas burner. In the invention, a powered flow of primary combustion air and gas flow are provided from within each of the plurality of burner outlets to form combusting gas/air jets with rapid and substantially complete combustion close to the burner outlets, in short, stable flames which are unaffected by the downdraft exhaust and other outside influences and provide even heat distribution.

Other features and advantages of this invention will be apparent from the drawings and description that follow.

BEST MODE OF THE INVENTION

Figure 1:
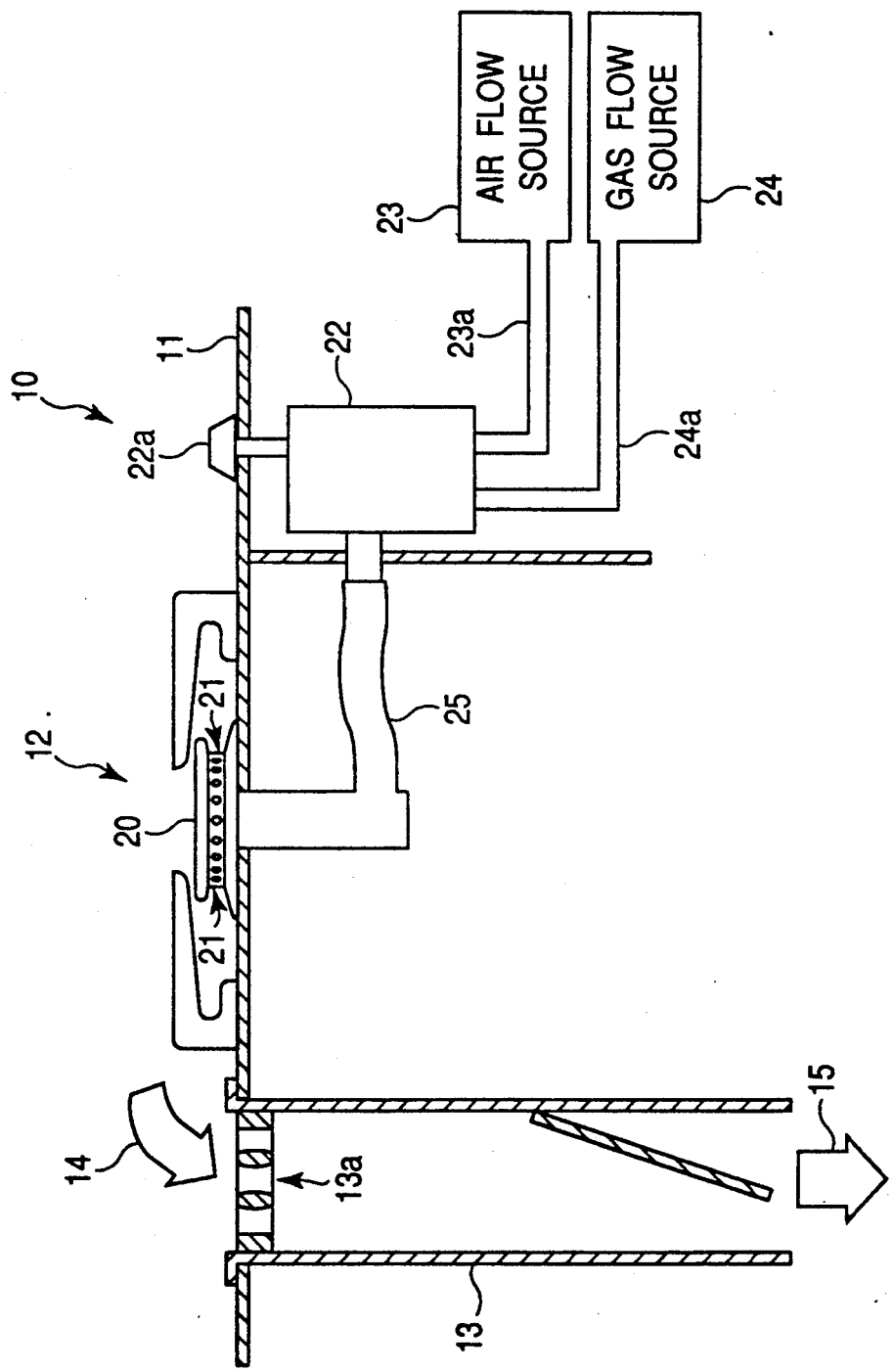
FIG. 1 is a diagrammatic partial cross-sectional drawing of a gas range of this invention to illustrate the invention.

FIG. 1 is a schematic, partially cross-sectional diagram of a downdraft gas range of the invention. As shown in FIG. 1, the gas range 10 includes a cooktop having a top surface 11 adapted to be sealed to a gas burner assembly 12. The range 10 further includes a downdraft plenum 13 with an entrance 13a adjacent the gas burner assembly 12. A downdraft plenum 13 is connected with an exhaust blower (not shown). When the exhaust blower is operated, the downdraft plenum 13 withdraws air and cooking vapors from adjacent the top surface 11 and gas burner assembly 12 of the range, as indicated by arrows 14 and 15. The sealed gas burner assembly 12 includes a gas burner 20 having a plurality of burner outlets 21, a combined air and gas flow supply means 22 adapted for connection with an air flow source 23 and a gas flow source 24. A sealed conduit 25 is connected between the gas burner 20 and the combined air and gas flow supply means 22 and a variable supply of a combustible mixture of gas and air to burner 20 is controlled by knob or handle 22a. The combined air and gas flow supply means 22 includes means for combining the flows of air and gas and means for controlling the air flow and gas flow to provide a combined flow of air and gas through the conduit 25 and the gas burner outlets 21 for controllable combustion.

Figure 2:
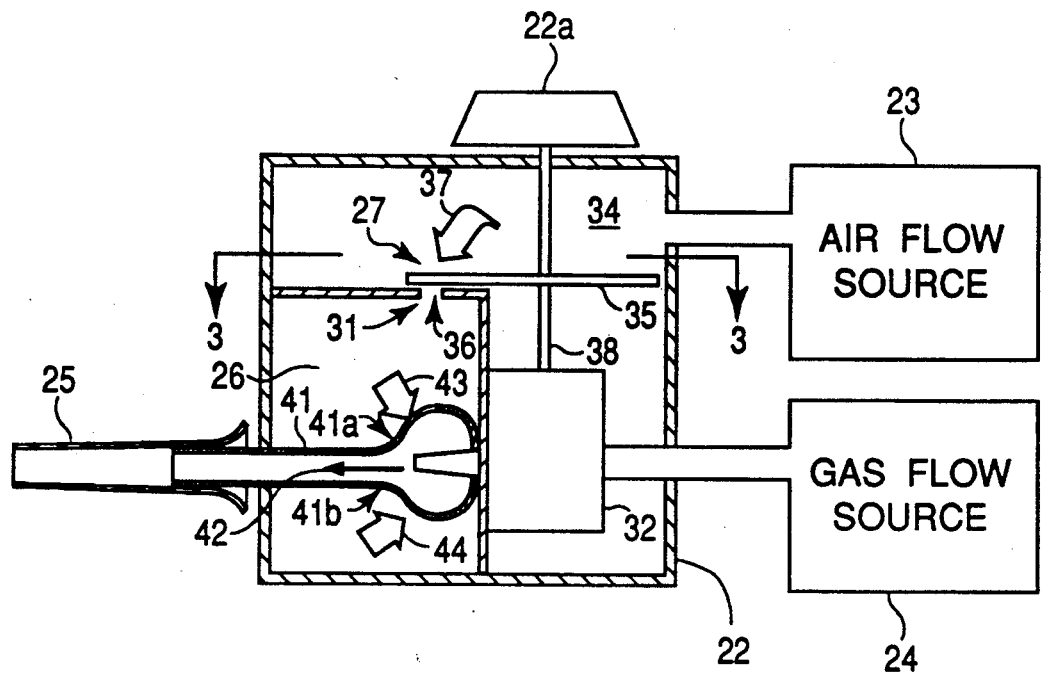
FIG. 2 is a diagrammatic partial cross-section of a combined air and gas flow supply means of FIG. 1.

As shown in FIG. 2, the air and gas flow supply means 22 for providing a combined air flow and gas flow includes a mixing manifold or plenum 26 between the sealed conduit 25 and the air flow and gas flow sources 23 and 24, respectively. The air and gas flow supply means 22 also provides control means 27 for providing a controlled flow of both air and gas from the manifold 26 to the sealed conduit 25. As shown in FIG. 2, the control means 27 comprises a separate air flow control means 31 between the air flow source 23 and the manifold 26 and a separate gas control valve 32 between the gas flow source 24 and the manifold 26.

Figure 3:
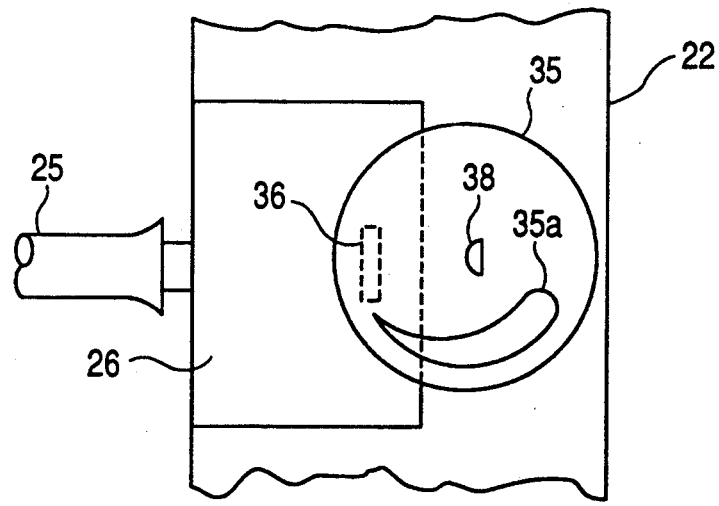
FIG. 3 is a top view of FIG. 2 taken at a plane through line 3—3 of FIG. 2.

In the embodiment of the combined air flow and gas flow supply means 22 that is shown in FIGS. 2 and 3, air flow from air flow source 23 is directed to a large reservoir 34 in communication with the manifold or plenum 26. Air flow control means 31 is formed by a rotating air flow control plate 35 and an air flow opening 36 formed in the manifold 26. As indicated in FIG. 2 and shown in FIG. 3, the air flow control plate 35 includes a shaped flow control orifice 35a and lies adjacent to and over the air flow orifice 36. By rotating the air flow control plate 35 clockwise in FIG. 3, the air flow opening 36 becomes progressively less blocked by the flow control orifice 35a of air flow control plate 35 thereby controlling the air flow, indicated by arrow 37 in FIG. 2, from the air flow source 23 to the manifold or plenum 26 through air flow opening 36. As shown in FIG. 2, the air flow control plate 35 is mounted on an actuator shaft 38 which also controls the gas flow control valve 32. By rotation of the knob or handle 22a, a user of the range may simultaneously control the gas flow through gas flow control valve 32 from the gas flow source 24 into injector 41 and conduit 25, and the air flow from air source 23 through air flow opening 36 into manifold 26, injector 41 and conduit 25.

As indicated in FIG. 2, the manifold 26 includes an injector 41. Gas flow from the gas flow control valve 32, indicated by arrow 42, induces the flow of air, indicated by arrows 43 and 44, through injector openings 41a and 41b for mixing with the gas flow 42. The combined air flow and gas flow are directed by injector 41 into the sealed conduit 25 for direction to the gas burner 20 and through the gas burner outlets 21 (shown in FIG. 1). Air flow source 23, preferably, includes a small air blower providing a controllable flow of air to air reservoir 34.

Figure 4A:
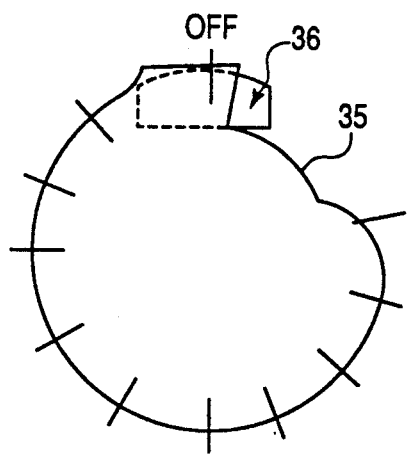
FIG. 4A is a simplified view of the air flow control plate and orifice of the combined air and gas flow supply means of FIG. 4.
Figure 4:
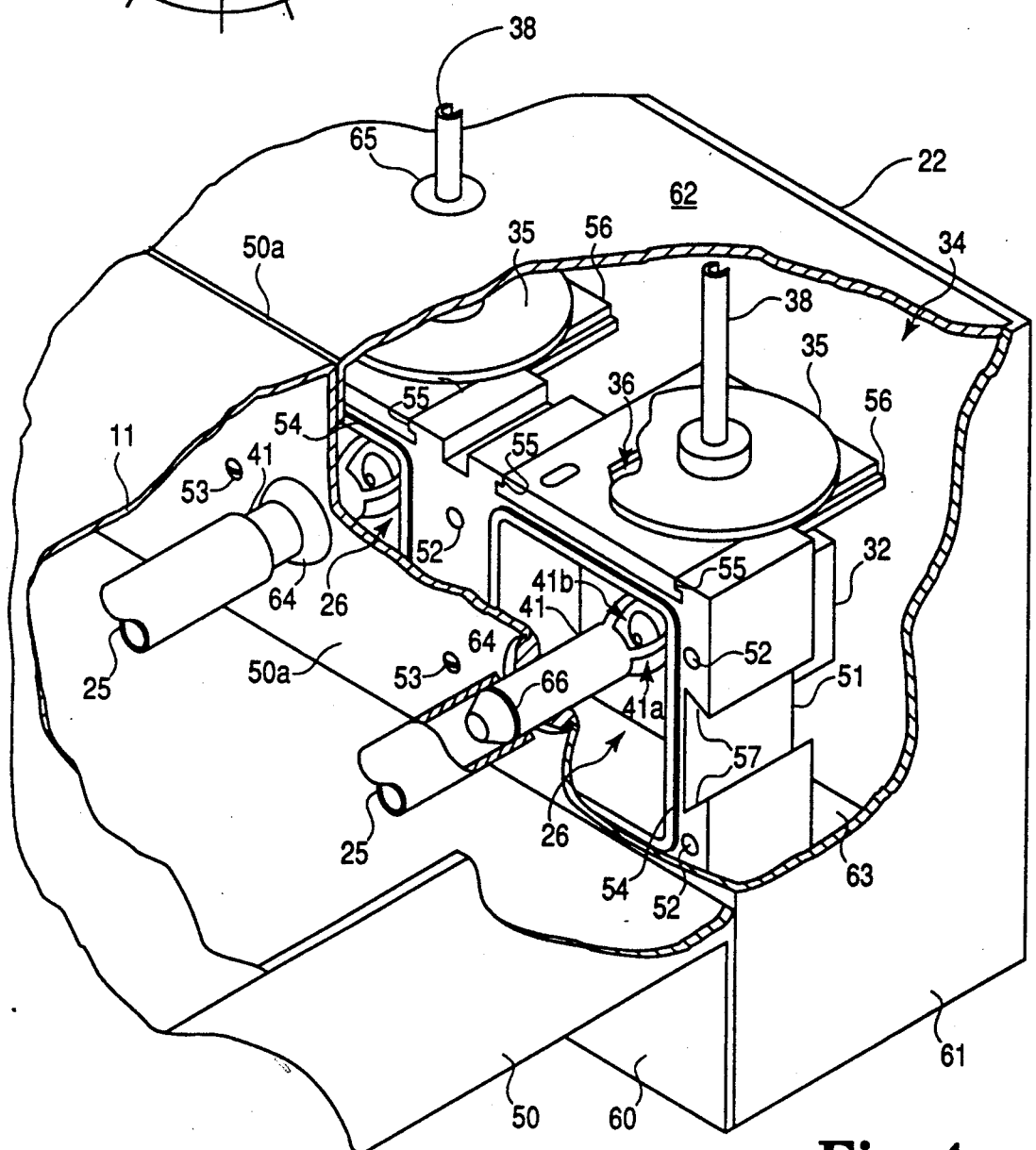
FIG. 4 is a partially broken-away perspective view of a preferred combined air and gas flow supply means of this invention.

FIG. 4 is a partially cut-away, perspective view of a preferred embodiment of the combined air and gas flow supply means 22 which is constructed in a manner similar to that indicated in FIGS. 2 and 3 but is adapted for manufacture and for use in a household downdraft gas range. The structure shown in FIG. 4 is adapted for a gas range with a plurality of gas burners; however, the elements of the FIG. 4 embodiment that correspond to the elements illustrated in FIGS. 1–3 carry the same element numbers.

In the structure shown in FIG. 4, the range top surface 11 (partially broken away) which carries a plurality of gas burners 20 is fastened to a sheet metal weldment 50 which forms a burner box, as is well known in the art, and houses a plurality of sealed conduits 25 which lead to the plurality of gas burners 20 (not shown in FIG. 4) sealed to surface 11. The mixing manifold or plenum 26 for each of the plurality of gas burners may be formed by an injection box molding 51. For ease of assembly, the injection box 51 may be molded to form a plurality of plenum-forming cavities 26 so that when the injection box 51 is fastened to the side wall 50a (partially broken away) of the burner box 50, as indicated in FIG. 4, it forms a manifold, or plenum, 26 for each of the gas burners. As indicated in FIG. 4, the injection box 51 may be molded to include a plurality of bores 52 to permit it to be fastened to the burner box 50 by screws 53 as indicated in FIG. 4. The injection box 51 may also be formed with channels 54, one surrounding each plenum-forming cavity 26, in the face which mates the wall 50a of the burner box 50. The channels 54 are adapted to carry O-ring seals so that upon assembly of the injection box 51 to the wall 50a of the burner box 50, the plenum-forming cavities 26 are sealed.

In addition, as shown in FIG. 4, the top of the injection box may be provided with a plurality of tongue and grooved portions 55 to permit a mating plate 56 which carries the air flow opening 36, to be inserted into and carried by the injection box 51. By molding the injection box 51, it may be economically provided with a number of other features, such as formed grooves 57 and tongues (not shown) in their sides so that each injection box 51 can be molded with a pair of plenum-forming cavities 26, but can provide tongue and groove assembly with another injection box, end-to-end in a row, permitting simple assembly for gas ranges with 2, 4 and 6 gas burners.

As indicated in FIG. 4, the injection box 51 forming a manifold, or plenum, 26 is carried within a large reservoir or air plenum 34 which is formed by a plurality of sheet metal wall portions carried by the burner box 50. For example, the larger reservoir 34 can be formed by a partial side wall 60, a piece of sheet metal 61 formed to provide side and back walls, a sheet metal top 62 and a sheet metal bottom 63. The reservoir 34 is connected with an air flow source 23 (see FIGS. 1 and 2). The plenum forming injection box 51 is carried within the reservoir 34 by the burner box, and the injection box 51 carries at its back a plurality of gas flow control valves 32 which are also within the reservoir 34. The gas flow control valves 32 are connected from within the reservoir 34 to a gas flow source 24 (not shown in FIG. 4) by conduits as indicated in FIGS. 1 and 2. Gas flow to the gas burners is varied by rotating the actuator shafts 38 for the gas flow valves 32. As shown in FIG. 4, an air flow control plate 35 is carried on each of the actuators 38 immediately adjacent the plate 56 forming the air flow orifice 36. FIG. 4A is a view from above FIG. 4 showing the air control plate 35 and the cooperatively shaped air flow orifice 36. As shown in FIG. 4A, the air flow control plates or cams 35 have cam-like shapes of varying outer radii which are adapted to coact with the cooperatively shaped air flow openings or orifices 36 and provide variably-sized air flow openings and controlled air flows into the plenums 26 to provide a stable effective combustion of the variable gas flow to the burner 20, which is controlled by gas flow control valve 32 as a result of adjustment of the common actuator shaft 38.

In operation, a variable gas flow is directed into the injector 41 within plenum 26 from the gas flow control valve 32. A controlled flow of air is injected into the gas flow through injector openings 41a and 41b within the plenum 26. The combined air and gas flow is directed from the injector into the sealed conduit 25 leading to the gas burners 20. As indicated in FIG. 4, the reservoir 34 may be sealed at the openings provided for actuator shafts 38 with the plurality of grommets 65, the injector openings provided in the wall 50a of the burner box may be sealed against the plurality of injectors by grommets 64, and the injectors 41 may be sealed with the sealed conduits 25 by an O-ring seal 66 carried by the injectors 41.

In the invention, a variable flow of gas for open flame cooking, at rates permitting a slow simmer as well as rapid heating, is combined with an accurate and controllable variable air flow at rates desirable for effective, substantially complete combustion of the gas with a substantially reduced need for secondary combustion air, and the accurately combined gas/air mixture is delivered to the burner outlets 21 through a sealed conduit 25 thereby preventing dilution and variation of the desired combustible mixtures, limiting the undesirable generation of CO and $NO_x$ and preventing operation of the downdraft exhaust from affecting the desired combustible mixture. The burner outlets or ports of the standard burner preferred for use in the invention have standard diameters of about 0.05 to about 0.15 inch and preferably relatively long bore lengths having a substantial fraction of an inch, for example, about 0.312 to about 0.343 inch. One such burner may have, for example, a first ring of 18 ports with a diameter of 0.142 inch, and 6 ports with a diameter of 0.079 inch, all with a bore length in the above range. The burner may also have a second ring of 16 ports with a diameter of 0.051 inch and a bore length of 0.060 inch spaced below the first ring. The combination of such burner outlets with relatively high air flow rates, providing, for example, a substantial percentage of the combustion air needed, improve burner operation. Orifices or ports formed with thin walls, such as 0.030 inch are not preferred. Furthermore, the combination of a burner provided with gas flow and a desirable high percentage rate of combustion air flow through a sealed conduit (thereby substantially reducing the burners need for secondary air) and an effective adjacent downdraft exhaust provides a household gas range which can substantially free the household of undesirable pollutants.

In the invention, a powered flow of combustion air and a gas flow are provided from within each burner outlet to form combusting gas/air jets with rapid and substantially complete combustion of the gas close to the burner outlets in short, stable flames which are unaffected by the downdraft exhaust and other outside influences and provide even heat distribution around the burner. The resulting flames are believed to be impervious to the downdraft exhaust and other such outside influences because of the resulting "structural integrity" of the rapidly moving gas/air jet and its rapid, substantially complete combustion. For example, with the preferred burners and burner outlets described above, clean, sharp, stable flames can be obtained, providing even heat distribution as high as 10000 BTUH with a gas pressure of about 5 inches of water column pressure above atmospheric pressure, and with an estimated primary air flow rate in excess of about 70 to about 85 cubic feet per hour and preferably in excess of 85 cubic feet per hour.

Thus, the invention permits effective cooking with a gas burner and downdraft exhaust by directing a controllable flow of combustion air through a first conduit 23a, directing a controllable flow of gas through a second conduit 24a, mixing the controllable flows of combustion air and gas to provide a directed flow of combustion air and gas through a third sealed conduit 25 to a gas burner 20, controlling the flows of combustion air and gas to provide a controllable variable combustion of gas from the outlets 21 of gas burner 20, combusting the directed flow of combusted air and gas at the gas burner outlets 21 for cooking, and exhausting gaseous combustion and cooking byproducts by providing a downdraft exhaust into plenum 13 adjacent the gas burner 20.

In the method of the invention, the flows of air and gas are preferably controlled before they are mixed as shown in FIGS. 2-4, but they may also be controlled after they are mixed. The flows of combustion air and gas are preferably passed through at least one manifold or plenum 26 and are mixed in a mixing head such a the injector 41. In the method of the invention, the downdraft exhaust can be urged into an entrance 13a in the sealed top 11 of the gas range adjacent the gas burner 20. The directed flows of combustion air and gas are divided at the gas burner into a plurality of flows for combustion and the plurality of flows are given flow rates and velocities that provide stable gas/air jets, rapid and substantially complete combustion and cooking flames that provide even heating in the presence of the adjacent downdraft exhaust. The method further includes control of the air flow, for example by air flow control plate 35, to provide for variable gas flows from gas flow valve 32 and an air flow rate required to burn gas flow down to low rates, for example, rates low enough to provide simmering food stuffs.

Thus, the method and apparatus of the invention provides a plurality of flows of gas and combustion air at the gas burner to direct a plurality of easily ignited and stable flames with optimal flame velocity and combustion to provide variable and even heat generation substantially free of pollutants. The invention permits the achievement of such results with heat outputs from about 2000 BTUH to about 12000 BTUH with larger burners and from 1500 BTUH to about 10000 BTUH with smaller burners. The invention also provides a gas range which may be operated so that the directed flow of air and gas is provided only in the presence of a downdraft exhaust.

In one example of the invention, it was found that heat was evenly distributed to a 10 inch black cast-iron skillet, permitting pancakes to be cooked quickly with even doneness on all portions of the skillet in the presence of a downdraft exhaust through an exhaust opening adjacent the gas burner at a downdraft flow rate of approximately 300 cubic feet per minute throughout the system and a velocity of 1,400 feet per minute at the exhaust opening. The invention permitted the obtaining of clean, sharp, stable flames with approximately 10,000 BTUH output at about 5 inches of water column pressure above atmospheric pressure.

While the description and drawings set forth the currently known best mode of the invention, other embodiments of the invention may be made without departing from the scope of the claims that follow. Accordingly, the invention is to be limited only by the scope of the claims and the prior art.

I claim:

1. A downdraft gas range with a forced draft gas burner, comprising:
   a cooktop comprising a top surface adapted to be sealed to a gas burner assembly;
   a downdraft plenum adjacent the gas burner assembly adapted to withdraw combustion byproducts and cooking vapors from adjacent the top surface and gas burner assembly; and
   a sealed gas burner assembly comprising a gas burner having a plurality of burner outlets, combined air and gas flow supply means adapted for connection with an air flow source above atmospheric pressure and a gas flow source, and a sealed conduit connected between said gas burner and said combined air and gas flow supply means, said combined air and gas flow supply means including means for combining air flow and gas flow from said air flow source and gas flow source and control means for controlling the air flow together with the gas flow to provide a combined flow of air and gas through said sealed conduit and said gas burner outlets for controllable combustion.

2. The downdraft gas range of claim 1 wherein said means combining air flow and gas flow comprises a mixing means between said sealed conduit and said air flow source and gas flow source, and said control means provides a controlled flow of air and gas to said mixing means and to said sealed conduit.

3. The downdraft gas range of claim 2 wherein said control means comprises a separate air flow control valve between said air flow source and said mixing means and a separate gas control valve between said gas flow source and said mixing means.

4. The downdraft gas range of claim 2 wherein said mixing means comprises a mixing manifold.

5. The downdraft gas range of claim 1 wherein said gas burner outlets have bore length of a substantial fraction of an inch.

6. A method of cooking with a gas burner and a downdraft exhaust, comprising:
   directing a controllable flow of combustion air above atmospheric pressure thorough a first conduit;
   directing a controllable flow of gas through a second conduit;
   mixing the controllable flows of combustion air and gas to provide a directed combustible flow of air and gas through a third sealed conduit to the gas burner;
   controlling the flows of combustion air and gas simultaneously and in a variable manner to provide a controlled variable combustion of gas at the gas burner;
   combusting the directed flow of combustion air and gas from the gas burner for cooking; and
   exhausting gaseous combustion and cooking by-products by providing a downdraft adjacent the gas burner.

7. The method of claim 6 wherein the flows of air and gas are controlled before they are mixed.

8. The method of claim 6 wherein the flows of air and gas pass through at least one plenum.

9. The method of claim 6 wherein the flows of air and gas are mixed in a mixing means.

10. The method of claim 6 wherein the gas burner is carried by a sealed top and the by products are exhausted into an opening in the sealed top adjacent to the gas burner.

11. The method of claim 6 wherein the directed flow of air and gas is divided by the gas burner into a plurality of flows of mixed gas and air for combustion and said plurality of flows of mixed gas and air are given flow rates providing jet-like velocity and rapid combustion in short, stable cooking flames providing even heating in the presence of the adjacent exhaust.

12. The method of claim 11 wherein the air flow and the gas flow are controlled to provide a gas/air velocity from the burner outlets providing flames with structural integrity.

13. The method of claim 9 wherein the controllable flows of air and gas are mixed by injecting a controlled flow of air into the controlled flow of gas.

14. The method of claim 6 wherein said directed flow of air and gas is terminated simultaneously with termination of said downdraft exhaust.

15. A method of cooking with a gas burner and a downdraft exhaust, comprising:
   directing a controllable flow of air above atmospheric pressure in excess of 85 cubic feet per hour through a first conduit;
   directing a controllable flow of gas providing upon combustion as high as 10000 BTUH through a second conduit;
   controlling the flow of gas simultaneously with the flow of air in a variable manner;
   mixing the controllable flows of air and gas to provide a directed combustible flow of air and gas through a third sealed conduit to the gas burner;
   combusting the directed flow of air and gas from the gas burner including a plurality of outlets having bore lengths of a substantial fraction of an inch for cooking;
   exhausting gaseous combustion and cooking by-products by providing a downdraft adjacent the gas burner.

16. The method of claim 6 wherein said controlled flow of combustion air provides a substantial percentage of the combustion air needed for said controllable flow of gas.

17. The method of claim 6 wherein said combustible flow of air and gas provides a plurality of gas/air jets having a gas/air velocity and mixture providing short, stable flames substantially impervious to downdraft exhaust air.

18. The method of claim 6 wherein said gas burner and said controllable flow of air and gas provide flows of gas and air from said burner at velocities providing flames with structural integrity.

* * * * *

UNITED STATES PATENT AND TRADEMARK OFFICE
CERTIFICATE OF CORRECTION

PATENT NO. : 5,213,091
DATED : May 25, 1993
INVENTOR(S) : Stanley H. Beach

It is certified that error appears in the above-identified patent and that said Letters Patent is hereby corrected as shown below:

Col. 9, line 8          "a" (second occurrence) should be -- as --

Col. 12, line 16        "controllable" should be -- combustible --

Signed and Sealed this

Twenty-ninth Day of March, 1994

Attest:

BRUCE LEHMAN

Attesting Officer          Commissioner of Patents and Trademarks